(12) United States Patent
Hokari et al.

(10) Patent No.: US 8,293,826 B2
(45) Date of Patent: Oct. 23, 2012

(54) ALIPHATIC POLYESTER RESIN COMPOSITION

(75) Inventors: Yuki Hokari, Fukushima-Ken (JP); Tsukasa Ikeda, Fukushima-Ken (JP); Kazuyuki Yamane, Fukushima-Ken (JP)

(73) Assignee: Kureha Corporation, Tokyo (JP)

( * ) Notice: Subject to any disclaimer, the term of this patent is extended or adjusted under 35 U.S.C. 154(b) by 406 days.

(21) Appl. No.: 11/885,041

(22) PCT Filed: Feb. 9, 2006

(86) PCT No.: PCT/JP2006/302253
§ 371 (c)(1), (2), (4) Date: Aug. 24, 2007

(87) PCT Pub. No.: WO2006/095526
PCT Pub. Date: Sep. 14, 2006

(65) Prior Publication Data
US 2008/0167409 A1 Jul. 10, 2008

(30) Foreign Application Priority Data
Mar. 8, 2005 (JP) .................. 2005-063668

(51) Int. Cl.
*C08K 5/00* (2006.01)
(52) U.S. Cl. ........................ 524/145; 524/147
(58) Field of Classification Search .................... 524/145
See application file for complete search history.

(56) References Cited

U.S. PATENT DOCUMENTS

| 4,189,549 | A | * | 2/1980 | Matsunaga et al. | 525/439 |
|---|---|---|---|---|---|
| 5,114,995 | A | * | 5/1992 | Golder et al. | 523/506 |
| 5,686,540 | A | * | 11/1997 | Kakizawa | 525/444 |
| 2003/0125508 | A1 | * | 7/2003 | Yamane et al. | 528/354 |
| 2004/0132860 | A1 | * | 7/2004 | Takahashi et al. | 523/124 |
| 2005/0054810 | A1 | * | 3/2005 | Yamada et al. | 528/272 |

FOREIGN PATENT DOCUMENTS

| EP | 1 449 864 | 8/2004 |
|---|---|---|
| EP | 1 686 146 | 8/2006 |
| JP | 2003-305817 | 10/2003 |
| JP | 2004-263157 | 9/2004 |
| JP | 2004-300197 | 10/2004 |
| WO | WO 03/091310 | * 11/2003 |
| WO | 2005/035623 | 4/2005 |

OTHER PUBLICATIONS

Derwent Abstract of JP 02-286690, Inui et al, Jan. 1991.*
Database WPI Week 200534, Thomas Scientific, London, GB; AN 2005-333082, XP002518054.

* cited by examiner

*Primary Examiner* — Doris Lee
(74) *Attorney, Agent, or Firm* — Wenderoth, Lind & Ponack, L.L.P.

(57) ABSTRACT

An aliphatic polyester resin composition of improved moisture resistance formed by adding a phosphoric or phosphorous acid ester having a basicity of at most 1.4 of a saturated aliphatic alcohol having 8-24 carbon atoms.

3 Claims, No Drawings

//]: #

ALIPHATIC POLYESTER RESIN COMPOSITION

TECHNICAL FIELD

The present invention relates to a resin composition principally comprising an aliphatic polyester, such as polyglycolic acid, particularly a composition improved in resistance to hydrolysis (moisture resistance).

BACKGROUND ART

An aliphatic polyester, such as polyglycolic acid or polylactic acid, can be decomposed by microorganisms or enzymes present in nature, such as soil or sea water, and is therefore noted as a biodegradable polymer material giving little load to the environment. Further, an is aliphatic polyester has degradability and absorbability in vivo, so that it is used also as a polymer material for medical use, such as sutures for surgery or artificial skin.

Among the aliphatic polyesters, polyglycolic acid is excellent in gas barrier properties, such as oxygen gas barrier property, carbon dioxide gas barrier property and water vapor barrier property, and also is excellent in heat resistance and mechanical properties, and therefore the development of new use thereof by itself or as a composite material together with another resin material, is under way.

However, aliphatic polyesters, inclusive of polyglycolic acid, are generally hydrolyzable and accompanied with a problem that the barrier property and strength are impaired along with the hydrolysis.

In melt-processing of aliphatic polyester resins including polyglycolic acid, various phosphoric or phosphorous acid esters are incorporated for improving thermal properties, such as melt stability and crystallinity (Patent document 1 listed below). (Herein, the term "phosphoric or phosphorous acid ester" is used to collectively refer to at least one of phosphoric acid esters and phosphorous acid esters.) However, it is difficult to regard that the resultant aliphatic polyester resin composition has been effectively improved in moisture resistance.

Patent document 1: WO2003/037956A1

DISCLOSURE OF INVENTION

Accordingly, a principal object of the present invention is to provide an aliphatic polyester resin composition improved in moisture resistance.

A further object of the present invention is to provide an aliphatic polyester resin composition improved in thermal stability in addition to the moisture resistance.

Having been developed for accomplishing the objects, the aliphatic polyester resin composition of the present invention comprises: an aliphatic polyester resin, and a phosphoric or phosphorous acid ester having a basicity of at most 1.4 of a saturated aliphatic alcohol having 8-24 carbon atoms.

A brief description is added about a history through which the present inventors have arrived at the present invention as a result of study with the above-mentioned object. The present inventors have found that, among various additives disclosed in the above-mentioned Patent document 1 principally for the purpose of improving thermal properties, a phosphoric acid ester of saturated aliphatic alcohol is effective for improving the moisture resistance of aliphatic polyester resins. However, the resultant composition has not been provided with a satisfactory level of moisture resistance. As a result of further study, there has been obtained knowledge that the phosphoric acid ester of saturated aliphatic alcohol used in Patent document 1 is actually a mixture of dialkyl ester and monoalkyl ester of phosphoric acid that is a tribasic acid, as a result of a generally known synthesis process including a reaction between phosphor pentoxide and aliphatic alcohol and that, of them, a component effective for improving the moisture resistance is the dialkyl ester (basicity=1) and the monoalkyl ester (basicity=2) is not so effective. Accordingly, it has been found that, among mixtures of the same dialkyl ester and monoalkyl ester, one having a higher proportion of dialkyl ester (i.e., having a lower basicity) results in an aliphatic polyester resin composition having a higher moisture resistance, and a mixture having a basicity of at most 1.4 and containing a larger proportion of dialkyl ester than a conventional mixture of dialkyl ester and monoalkyl ester (molar ratio=1:1, basicity=1.5) results in a composition with a significantly improved moisture resistance. Further, it has been confirmed that the addition of dialkyl ester (basicity=ca. 0) of phosphorous acid (that is a dibasic acid) is also very effective for improving the moisture resistance of an aliphatic polyester resin composition. These results may be attributable to an understanding that a phosphoric or phosphorous acid ester having a higher degree of esterification (and having a basicity of at most 1.4) shows a higher effect of improving the moisture resistance because it contains less acid residue which obstructs the improvement in moisture resistance. The aliphatic polyester resin composition of the present invention has been obtained based on the above findings.

BEST MODE FOR PRACTICING THE INVENTION

The aliphatic polyester resins constituting the aliphatic polyester resin composition according to the present invention may include homopolymers and copolymers of aliphatic ester monomers, inclusive of: glycolic acid including glycolic acid and glycolide which is a bimolecular cyclic ester of glycolic acid; cyclic monomers, inclusive of ethylene oxalate (i.e., 1,4-dioxane-2,3-dione); lactides; lactones, such as β-propiolactone, β-butyrolactone; pivalolactone, γ-butyrolactone, δ-valerolactone, β-methyl-δ-valerolactone, and ε-caprolactone; carbonates, such as trimethylene carbonate; ethers, such as 1,3-dioxane; ether-esters, such as dioxanone; and amides, such as ε-caprolactam; hydroxycarboxylic acids, such as lactic acid, 3-hydroxypropanoic acid, 4-hydroxybutanoic acid and 6-hydroxycaproic acid, and their alkyl esters; substantially equal molar mixtures of aliphatic diols, such as ethylene glycol and 1,4-butane diol with aliphatic dicarboxylic acids, such as succinic acid and adipic acid, and their alkyl or aromatic esters. Among these, it is preferred to use a homopolymer or a copolymer of hydroxycarboxylic acid in view of heat resistance, particularly a polyglycolic acid resin comprising a homopolymer or a copolymer of glycolic acid, which is excellent in heat resistance, gas-barrier property and mechanical strength.

More specifically, the polyglycolic acid resin used in the present invention is a homopolymer or a copolymer comprising a recurring unit (glycolic acid unit) represented by a formula: —(—O—CH$_2$—C(O)—)—. The content of the recurring unit represented by the above formula in the polyglycolic acid resin may be at least 60 wt. %, preferably at least 70 wt. %, more preferably at least 80 wt. %. The upper limit thereof is 100 wt. %. If the content of the recurring unit of the above formula is too little, the gas-barrier property and heat resistance are lowered.

The polyglycolic acid resin may be made a glycolic acid copolymer which is caused to contain polymerized unit of a comonomer copolymerizable with glycolic acid in addition to the glycolic acid unit represented by the above formula.

As the comonomers, it is possible to use the above-mentioned monomers for constituting the aliphatic polyester resin other than glycolic acid, particularly α-hydroxy-carboxylic acids, among which lactic acid (or the lactide thereof is preferred.

The glycolic acid (co)polymer used in the present invention may preferably have a melt viscosity of 100-10,000 Pa·s, more preferably 300-15-8,000 Pa·s, particularly preferably 400-5,000 Pa·s, when measured under the conditions of a temperature of 240° C. and a shear rate of 100 sec$^{-1}$.

According to the present invention, a phosphoric or phosphorous acid ester of a saturated aliphatic alcohol is added to the above-mentioned aliphatic polyester resin including polyglycolic acid resin. Particularly, in the present invention, a phosphoric or phosphorous acid ester having a basicity of at most 1.4 of a saturated aliphatic alcohol having 8-24 carbon atoms, is used. If the saturated aliphatic alcohol giving the phosphoric or phosphorous acid ester has less than 8 carbon atoms, the ester is liable to be evaporated at the melting temperature, so that the addition thereof becomes difficult, and in excess of 24, the melt-kneading is liable to be insufficient. Specific examples of the saturated aliphatic alcohol having 8-24 carbon atoms may include: octyl alcohol ($C_8$), nonyl alcohol ($C_9$), decyl alcohol ($C_{10}$), lauryl alcohol ($C_{12}$), myristyl alcohol ($C_{14}$), cetyl alcohol ($C_{16}$), stearyl alcohol ($C_{19}$) and eicosyl alcohol ($C_{20}$), and it is particularly preferred to use a phosphoric or phosphorous acid ester of a solid saturated aliphatic alcohol having 10-20 carbon atoms. The phosphoric or phosphorous acid ester of a saturated aliphatic alcohol is required to have a basicity of at most 1.4, preferably at most 1.3, particularly preferably ca. 1 or ca. 0. Examples of the phosphoric or phosphorous acid ester may include mixtures of dialkyl ester and monoalkyl ester of phosphoric acid having a basicity of at most 1.4 (i.e., mixing mol ratios of 6:4 or above), preferably at most 1.3; dialkyl ester of phosphoric acid (basicity=ca. 1.0) and dialkyl ester of phosphorous acid (basicity=ca. 0). These species of the phosphoric or phosphorous acid ester can be used in mixture.

In order to provide the aliphatic polyester resin composition of the present invention, it is preferred to add the phosphoric or phosphorous acid ester in 0.003-3 wt. parts, more preferably 0.003-1 wt. part, particularly preferably 0.005-0.1 part, per 100 wt. parts of the aliphatic polyester resin. Below 0.003 wt. part, the addition effect is scarce, and in excess of 3 wt. parts, the melt-kneading is liable to be insufficient.

In order to admix the phosphoric or phosphorous acid ester with the aliphatic polyester resin, it is preferred to melt-knead the both components in an extruder. As a result thereof, it becomes possible to provide an aliphatic polyester resin composition with a uniformly improved moisture resistance. It is particularly preferred to effect the melt-kneading at a temperature of 200-300° C. by means of a twin-screw extruder.

To the aliphatic polyester resin composition of the present invention, it is possible to add a carboxyl group-capping agent in addition to the above-mentioned phosphoric or phosphorous acid ester of a saturated aliphatic alcohol, so as to aim at providing a further improved moisture resistance. As the carboxyl group-capping agent, it is generally possible to use compounds having a function of capping a carboxyl terminal and known as an agent for improving moisture resistance of aliphatic polyesters, such as polylactic acid. Examples thereof may include: carbodiimide compounds inclusive of monocarbodiimides and polycarbodiimides, such as N,N,2, 6-diisopropylphenylcarbodiimide; oxazoline compounds, such as 2,2'-m-phenylene-bis(2-oxazoline), 2,2'-p-phenylene-bis(2-oxazoline), 2-phenyl-2-oxagoline, and styrene-isopropenyl-2-oxazoline; oxazine compounds, such as 2-methoxy-5,6-dihydro-4H-1,3-oxazine; and epoxy compounds, such as N-glycidylphthalimide, cyclohexene oxide, and tris(2,3-epoxypropyl) isocyanurate. Among these, carbodiimide compounds and epoxy compounds are preferred. These carboxyl group-capping agents can be used in combination of two or more species as desired, and may preferably be used in a proportion of 0.01-10 wt. parts, further preferably 0.1-2 wt. parts, particularly preferably 0.2-1 wt. part, per 100 wt. parts of the aliphatic polyester resin.

In the aliphatic polyester resin composition according to the present invention, in addition to the above-mentioned moisture resistance-improving agent, it is possible to incorporate 0.001-5 wt. parts of other additives for improving other properties, as desired, per 100 wt. parts of the aliphatic polyester resin, such as a thermal stabilizer, a terminal capping agent, a plasticizer, a thermal radiation absorber, an ultraviolet ray absorber, a pigment, etc. It is also preferred that these additives are melt-kneaded with the aliphatic polyester resin together with the above-mentioned phosphoric or phosphorous acid ester by means of an extruder.

The aliphatic polyester resin composition thus-obtained according to the present invention may be formed by itself or as a mixture with another thermoplastic resin (preferably containing the aliphatic polyester resin in at least 90 wt. %) or as a composite material, such as a laminate product, into various shapes of a film or sheet, a filament, a blow-molded container, a lid, a bag-shaped container and a tubular packaging material. The film or sheet may ordinarily be further processed and formed into a cup, a tray, a bag-shaped container, etc.

Examples of another thermoplastic resin may include polyolefin resins, thermoplastic polyester resins, polystyrene resins, chlorine-containing resins, polyamide resins, polycarbonate resins, cyclic olefin resins, polyurethane resins, polyvinylidene chloride resin, ethylene-vinyl alcohol copolymer (EVOH), and aliphatic polyester resins, and these resins can be used in mixture within an extent of not adversely affecting the desired properties of the shaped product.

In the laminate product, it is possible to dispose an adhesive resin layer between the respective layers for the purpose of, e.g., enhancing the inter-layer peeling strength. As the adhesive resin (or simply "adhesive"), it is preferred to use a resin that is capable of melt-processing, such as extrusion, and exhibits a good adhesiveness to the respective resin layers.

Examples of the adhesive agent may include: maleic anhydride-modified polyolefin resin "MODIC S525", made by Mitsubishi Jushi K.K.), a composition of carboxyl-modified polyolefin and epoxidized polyolefin including the carboxyl-modified polyolefin as a principal component, e.g., glycidyl group-containing ethylene copolymer ("LEXPEARL RA3150", made by Nippon Sekiyu K.K.; "BOND FAST 2C, E and B", made by Sumitomo Kagaku K.K.), thermoplastic polyurethane ("KURAMILON 1195L", made by Kuraray K.K.), polyamide ionomer ("AM7926", made by Mitsui Dupont K.K.), polyacrylimide resin ("XHTA", made by Rohm and Haas Co.), and acid-modified linear low-density polyethylene ("ADMER NF550", made by Mitsui Kagaku K.K.); MFR=6.2 g/10 min. (temperature; 190° C., load; 2160 g).

In the forming or processing of a sheet or film of the aliphatic polyester resin composition according to the present invention, the sheet or film can be uniaxially or biaxially stretched to enhance the degree of orientation, thereby improving the properties, such as gas barrier property and mechanical properties. During the stretching, it is important to set appropriate conditions. The stretching temperature may preferably be 80° C. or below, further preferably 45-65° C. The stretching ratio may preferably be 1.1-5.0 times, more preferably 2-4 times, in each of uniaxial (longitudinal) or biaxial (longitudinal and transversal) directions.

After the above stretching treatment, the stretched product may preferably be heat-treated by holding the product at 100-200° C. for 10 seconds to 20 minutes from the viewpoints of, e.g., further improvement of the size stability, heat resistance and gas barrier property of the shaped product.

The thus-obtained stretched or unstretched shaped product of a single layer of or laminate with another thermoplastic resin layer of aliphatic polyester resin can be further laminated with a further different thermoplastic resin layer by co-extrusion or lamination processing with an optionally used adhesive.

If a bottomed multilayer preform formed by laminating an aliphatic polyester resin composition of an improved moisture resistance obtained according to the present invention with an aromatic polyester resin such as PET is subjected to stretch-blow molding in a mold, it is possible to obtain a bottle excellent in properties, such as gas barrier property and mechanical properties. The bottomed multilayer preform may ordinarily have a thickness of 1-10 mm. For the stretching, the setting of appropriate conditions is important.

Similarly as other shaping processes, the heat source is not particularly restricted, such as IR (infrared rays), hot air, hot medium bath or electromagnetic wave, but the preform may ordinarily be preheated by an IR (infrared rays) heating apparatus and thereafter immediately be transferred into a mold, whereby the preform is blow-molded while being stretched by introducing compressed air through its mouth. The stretching can also be effected by using a rod simultaneously in addition to the compressed air. By the heating, it is preferred to elevate the surface temperature of the multilayer preform up to 80-200° C., more preferably 85-150° C., particularly preferably 90-120° C. In the case where the aliphatic polyester resin is polyglycolic acid resin, it becomes easier to obtain a transparent shaped body if the stretching is performed after the multilayer preform is crystallized by heating up to a haze value of at least 40%.

After the stretch forming described above, it is also possible to effect a post-treatment, such as heat-setting, or a post-treatment for providing an additional resin layer, such as lamination processing or coating. The treatment temperature for the heat-setting may preferably be 40-210° C., and a temperature of below the melting point of polyglycolic acid resin, more preferably in a temperature range of from the melting point minus 20° C. to 120° C. in the case where the aliphatic polyester is polyglycolic acid resin. The lamination processing may include: wet lamination, dry lamination, extrusion lamination, hot-melt lamination, non-solvent lamination, etc.

EXAMPLES

Hereinbelow, the present invention will be described more specifically based on Examples and Comparative Examples. In the following description, "parts", "%" and "ppm" are by weight unless otherwise noted specifically.

<Preparation of Phosphoric or Phosphorous Acid Esters>
(1) Commercially Available Phosphoric Acid Ester Mixture A commercially available ester mixture comprising ca. 50 mol. % of monostearyl phosphate and ca. 50 mol. % of distearyl phosphate ("AX-71", made by Asahi Denka K.K.; basicity=ca. 1.5) was used as it was.

(2) Refined Phosphoric Acid Ester Mixture

In order to remove impurities from the above commercially available phosphoric acid ester mixture, 200 g thereof was added to 1 liter of hexane, heated until its dissolution and cooled by standing to room temperature, thereby resulting in a precipitate. The precipitate was recovered by filtration, washed with hexane and dried to obtain a dried crystalline product as a refined phosphoric acid ester mixture.

(3) Phosphoric Acid Diester 200 g of the above commercially available phosphoric acid ester mixture was added to 1 liter of hexane/methanol (1/1 by volume) mixture liquid, heated until its dissolution and cooled by standing to room temperature, thereby resulting in a precipitate. The precipitate was recovered by filtration, washed with hexane and dried to obtain crystalline distearyl phosphate (which was confirmed by $^1$H-NMR and elementary analysis).

(4) Phosphoric Acid Monoester

The filtrate liquid remaining after the recovery of the precipitate by filtration in (3) above was condensed to result in a precipitate. The precipitate was added to hexane, heated until its dissolution and cooled by standing to result in a precipitate. The precipitate was recovered by filtration, washed with hexane and dried to obtain crystalline monostearyl phosphate (which was confirmed by $^1$H-NMR and elementary analysis).

(5) Diester-Enriched Phosphoric Acid Ester

The diester and monoester obtained in the above (3) and (4) were blended at a weight ratio of 5:1 (corresponding to a mol ratio of ca. 7:3) to obtain an ester mixture enriched with diester (basicity=ca. 1.3).

(6) Refined Phosphorous Acid Ester

Commercially available tristearyl phosphite ("JP318E", made by Johoku-chemical K.K.) was added to 1 liter of ethanol/n-hexane (⅔ by weight) mixture liquid, heated until its dissolution and cooled by standing to room temperature to result in a precipitate. The precipitate was recovered by filtration, washed with ethanol and dried to obtain a crystal. As a result of $^1$H-NMR, the crystal was confirmed to be a mixture of 92.4% of distearyl phosphite and 7.6% of stearyl alcohol.

Comparative Examples 1-3 and Examples 1-2

To polyglycolic acid, 300 ppm thereof of each of the various phosphoric acid esters obtained in (1)-(5) above and 5000 ppm of N,N'-di-2,6-diisopropylphenylcarbodiimide (hereinafter abbreviated as "CDI") were added, and melt-kneading extrusion was performed by means of a twin-screw extruder ("TEM-41SS", made by Toshiba Kikai K.K.) with screw part temperatures set to 200-270° C. to obtain 5 types of polyglycolic acid (PGA) compositions (Comparative Examples 1-3 and Examples 1-2). From each of the compositions, sheets for moisture resistance evaluation were formed and moisture resistance changes thereof were evaluated in the following manner.

First, the pellets of each composition were heat-treated for 3 hours in an oven at 220° C. with an atmosphere of nitrogen flowing at a rate of 0.5 liter/min., thereby reducing the glycolide content from 0.14-0.22% to 0.01-0.04%.

<Formation of Sheets>

Then, ca. 5 g each of the above heat-treated pellets was sandwiched between aluminum plates and heated for 3 min. by a press machine at 255° C., followed by 20 sec. of pressing at 5 MPa and cooling by holding at 2 MPa for 20 sec. in a water-cooled press machine. The resultant sheet was treated for 10 min. in an oven ("WFO-601SD", made by Tokyo Rika Kikai K.K.) at 80° C. to obtain a crystalline sheet for evaluation of moisture resistance.

<Moisture Resistance Evaluation>

The above-obtained crystalline sheet (obtained in a plurality for each composition) was placed in an environment at a temperature of 50° C. and a humidity of 90%. After lapse of 0 day (i.e., immediately after preparation), 3 days, 5 days and 7 days, the respective sheets were subjected to measurement of molecular weights of PGA, and moisture resistance was evaluated based on the molecular weight retentivity.

<Molecular Weight Measurement>

Ca. 10 mg of a sample was cut out from each sheet and dissolved in 10 ml of hexafluoroisopropanol (HFIP) containing sodium trifluoroacetate dissolved therein at 5 mM. The resultant solution was filtrated through a 0.1 μm-membrane filter made of polytetrafluoroethylene and then injected into a GPC apparatus for measurement of molecular weight under the following conditions.

<GPC Measurement Conditions>

Apparatus: "Shodex-104" made by Showa Denko K.K.
Column: Two columns of "HFIP-606M" were connected in series with 1; column of "HFIP-G" as a pre-column.
Column temperature: 40° C.
Elution liquid: HFIP solution containing sodium trifluoroacetate dissolved at 5 mM.
Flow rate: 0.6 ml/min.
Detector: RI (differential refractive index) detector.
Molecular weight calibration: Effected by using 5 species of standard polymethyl methacrylate having different molecular weights.

The results are inclusively shown in Table 1 below.

Comparative Example 4 and Examples 3-4

To the same polyglycolic acid as used in the above Comparative Examples 1-3 and Examples 1-2, 300 ppm thereof of each of the above-mentioned commercially available polyglycolic acid ester mixture (1) (Comparative Example 4), phosphoric acid diester (2) (Example 3) and refined phosphorous acid (Example 4) and 5000 ppm of CDI were added, and melt-kneading extrusion was performed by means of a twin-screw extruder with screw-part temperatures set to 220-250° C. to obtain 3 types of PGA composition (Comparative Example 4 and Examples 3-4)

With respect to each composition after the same heat-treatment as in Examples 1-2, ca. 5 g each of the pellets were sandwiched between aluminum plates and heated for 3 min. in a press machine at 255° C. Then, the sample was pressed for 20 sec. at 5 MPa and then transferred to a press machine cooled with circulating water to be cooled by 20 sec. of holding at 2 MPa. the resultant sheet was placed for 1 min. in an oven ("DK63", made by Yamato Kagaku K.K.) at 70° C. and then stretched. Then, the sheet was held for 1 min. in an oven ("STPS-212", made by Tabai Espec K.K.) at 200° C. to obtain an amorphous stretched sheet.

The thus-obtained three types of amorphous stretched sheets were placed in an environment at a temperature of 50° C. and a humidity of 90% similarly as in Examples 1-2 for 0 day (immediately after preparation), 5 days, 10 days and 15 days. Thereafter, the respective sheets were subjected to evaluation of moisture resistance based on molecular weight change of the component PGAs. The results are inclusively shown in Table 2 below.

TABLE 1

Change in molecular weight (×10$^4$) (molecular weight retentivity (%)) of crystalline PGA left to stand in a high temperature/high humidity environment:

|  | Comp. 1 | Comp. 2 | Example 1 | Comp. 3 | Example 2 |
|---|---|---|---|---|---|
| Phosphoric acid ester | (1) Commercial ester mixture | (2) Refined ester mixture | (3) Diester | (4) Mono-ester | (5) Diester-enriched ester mixture |
| Basicity | 1.5 | 1.5 | 1.0 | 2.0 | 1.3 |
| Days of standing | | | | | |
| 0 day | 18.8 (100%) | 21.7 (100%) | 20.2 (100%) | 22.3 (100%) | 20.8 (100%) |
| 3 days | 14.6 (78%) | 16.7 (77%) | 17.3 (86%) | 13.8 (74%) | 16.2 (78%) |
| 5 days | 9.7 (52%) | 10.0 (46%) | 14.5 (72%) | 8.9 (40%) | 13.4 (65%) |
| 7 days | 6.5 (35%) | 6.6 (31%) | 9.4 (47%) | 5.0 (23%) | 7.4 (36%) |

The results of moisture resistance evaluation of crystalline sheets shown in Table 1 above allow the following evaluation. The ester mixture of Comparative Example 2 (basicity=1.5) obtained by refining the commercially available ester mixture of Comparative Example 1 (basicity=1.5) failed to provide an improvement in moisture resistance so that impurities other than ester are not believed to be substantially concerned with moisture resistance-improving effect. The diester of Example 1 isolated from the ester mixture provided a remarkable improvement in moisture resistance. On the other hand, Comparative Example 3 using the monoester isolated from the ester mixture showed a moisture resistance which was even lower than Comparative Examples 1 and 2 using ester mixtures, whereby it is understood that the moisture resistance-improving effect of the monoester is remarkably lower than that of the diester. On the hand, Example 2 using an ester mixture enriched with the diester so as to provide a lowered basicity of 1.3 showed a slight but significant improvement in moisture resistance.

TABLE 2

Change in molecular weight (×10$^4$) (molecular weight retentivity (%)) of amorphous stretched PGA left to stand in a high temperature/high humidity environment:

|  | Comp. 4 | Example 3 | Example 4 |
|---|---|---|---|
| Phosphoric or phosphorous acid ester | (1) Commercial ester mixture | (3) Phosphoric acid diester | (6) Refined phosphorous acid ester |
| Basicity | 1.5 | 1.0 | ca. 0 |
| Days of standing | | | |
| 0 day | 19.2 (100%) | 19.1 (100%) | 18.5 (100%) |
| 5 days | 12.3 (64%) | 17.2 (90%) | 16.2 (88%) |

TABLE 2-continued

Change in molecular weight (×10⁴) (molecular weight retentivity (%)) of amorphous stretched PGA left to stand in a high temperature/high humidity environment:

| | Example | | |
|---|---|---|---|
| | Comp. 4 | 3 | 4 |
| 10 days | 7.6 (40%) | 12.8 (67%) | 12.4 (67%) |
| 15 days | 4.2 (22%) | 6.8 (36%) | 7.4 (40%) |

As shown in Table 2 above, compared with Comparative Example 4 using the commercially available phosphoric acid ester mixture (basicity=1.5), amorphous stretched sheets of significantly improved moisture resistance were obtained by Example 3 using phosphoric acid diester (basicity=1.0) and Example 4 using refined phosphorous acid ester (basicity=ca. 0)

INDUSTRIAL APPLICABILITY

As described above, according to the present invention, it is possible to provide an aliphatic polyester resin composition with improved moisture resistance by adding a phosphoric or phosphorous acid ester having a basicity of at most 1.4 of a saturated aliphatic alcohol having 8-24 carbon atoms.

The invention claimed is:

1. An aliphatic polyester resin composition, comprising: a polyglycolic acid resin, and a phosphoric acid ester comprising a mixture of a monoalkyl ester and a dialkyl ester and having an overall basicity of at most 1.4 of a saturated aliphatic alcohol having 8-24 carbon atoms.

2. A composition according to claim 1, wherein the phosphoric acid ester has a basicity of at most 1.3.

3. A composition according to claim 1, wherein the saturated aliphatic alcohol is a solid saturated aliphatic alcohol having 10-20 carbon atoms.

* * * * *